United States Patent [19]
McSherry et al.

[11] Patent Number: 5,308,203
[45] Date of Patent: May 3, 1994

[54] SAW TIPPED ANCHOR INSERT

[75] Inventors: Thomas W. McSherry, Salem, N.Y.; Steven D. Townsend; Phillip S. Townsend, both of Waterbury, Conn.

[73] Assignee: Titan Technologies, Inc., Temple, Pa.

[21] Appl. No.: 965,735

[22] Filed: Oct. 23, 1992

Related U.S. Application Data

[63] Continuation-in-part of Ser. No. 949,425, Sep. 22, 1992, abandoned.

[51] Int. Cl.⁵ .............................................. F16B 13/04
[52] U.S. Cl. .................................... 411/31; 411/387; 411/395
[58] Field of Search .................. 411/31, 29, 178, 30, 411/386, 387, 395, 184, 399, 424, 166, 187, 188

[56] References Cited

U.S. PATENT DOCUMENTS

| | | | |
|---|---|---|---|
| 126,366 | 4/1872 | Wills | 411/387 |
| 1,762,349 | 6/1930 | Phillips | 411/31 |
| 2,395,063 | 2/1946 | Paulus | 411/188 X |
| 3,202,035 | 8/1965 | Rosselet | 411/31 |
| 3,208,542 | 9/1965 | Fischer | 411/31 X |
| 3,467,209 | 9/1969 | Chromy | 411/31 X |
| 4,402,637 | 9/1983 | Seghezzi et al. | 411/31 |
| 4,601,625 | 7/1986 | Ernst et al. | 44/387 |
| 4,642,012 | 2/1987 | Blucher et al. | 411/395 X |
| 4,741,654 | 5/1988 | Lovisek | 411/188 X |
| 5,039,262 | 8/1991 | Giannuzzi | 411/30 |
| 5,160,225 | 11/1992 | Chern . | |
| 5,234,299 | 8/1993 | Giannuzzi | 411/31 |

FOREIGN PATENT DOCUMENTS

| | | | |
|---|---|---|---|
| 1225529 | 9/1966 | Fed. Rep. of Germany | 411/395 |
| 2642801 | 8/1990 | France | 411/178 |
| 231155 | 6/1925 | United Kingdom | 411/387 |

Primary Examiner—Rodney M. Lindsey
Attorney, Agent, or Firm—Nolte, Nolte and Hunter

[57] ABSTRACT

A wall anchor for insertion in wall board and having a cylindrical body with an outer thread and an axial through passage extending from a flanged proximal end to a saw-tipped distal end. The cylindrical body comprises a proximal extension and a distal extension of approximately the same length equal to the width of wall board. The flange at the proximal end may be provided with locking tabs and the saw-tipped end may be provided with mashing teeth on a circumference of revolution smaller than that of the sawing teeth.

8 Claims, 3 Drawing Sheets

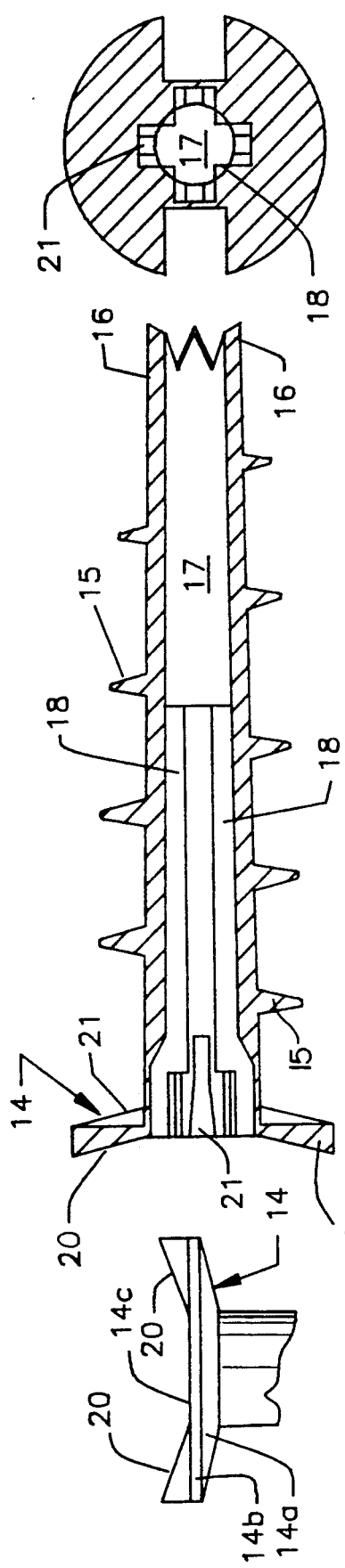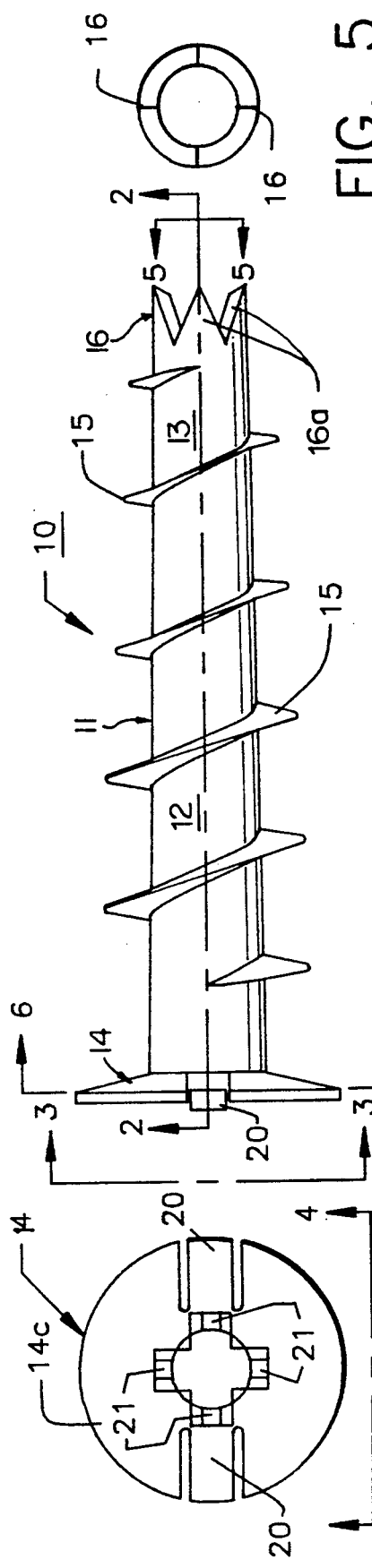

SAW TIPPED ANCHOR INSERT

This application is a continuation-in-part of application Ser. No. 07/949,425, filed Sep. 22, 1992 now abandoned.

BACKGROUND OF THE INVENTION

This invention relates to a wall anchor for securing a support fastener and particularly to a cylindrical wall anchor with outer threads for tapping into material of a dry wall or sheet rock.

SUMMARY OF THE INVENTION

Prior art threaded inserts, best typified by the self-drilling insert disclosed in U.S. Pat. No. 4,601,625, provide a drill tip which is not desirable because of the heat of friction generated between the drill and the wall material and because the wall material is pushed and compressed during the drilling process resulting in breakage of the wall material around the bore, at the rear surface of the wall and thus in a weakening of the wall's capacity to retain the anchor under stress.

It is an object of this invention to provide an outwardly threaded insert which has a cylindrical body with an axial through bore, an anti-rotational flange at the end of its proximal extension and a circular saw tip at the end of its distal extension for cutting a hole in the dry wall and permitting the dry wall material around which the tip has sawed to enter the axial bore so as not to be pushed and compressed and to "explode" out of the rear surface of the wall.

It is contemplated by this invention that the flanged end of the insert is provided with a recess for receiving a drive tool, such as a power driven screw driver, for rotating the saw-tipped end against and through the wall board and that the interior of the axial bore of the insert is splined along its proximal extension so that a screw fastener may tap the splines as it is screwed into the insert with the flanged end of the insert within the material at the front surface of the wall board. It is also contemplated by this invention that the saw-tipped distal extension which has captured the sawed material passed the teeth of the saw, extends passed the rear surface of the wall board by a distance substantially equal to the thickness of the wall board. Resultingly, the screw fastener, which may be longer than the width of the wall board, after tapping into the splines of the axial bore, which extend from the flanged end of the insert a distance substantially equal to the thickness of the wall board, may then thread into the captured material or act to push the material out of the saw-tipped end of the anchor.

In a preferred embodiment of the invention, the outer diameter of the proximal extension increases from its juncture with the distal extension to its flanged end, while the saw-tipped distal extension of the insert comprises a straight cylinder with a slightly smaller outside diameter than the increasing outside diameter of the flanged proximal extension.

The cylindrical body may be outwardly threaded substantially along its entire length with the height of the thread increasing from the saw-tipped end to the flanged end inasmuch as the sawing action through the wall, rather than drilling, facilitates a quick insertion which is not diminished by the entry of the threads into the wall material surrounding the hole. The increase in the height of the thread from distal end to proximal end together with the increase in diameter of the proximal extension results in a gradual increase in the size of the tapping in the wall material to more gently push the wall material radially about the increasing height of the thread around the insert, thus, again avoiding "exploding" the wall material about the insert during insertion while providing a strong grip between the wall material and insert when in place.

It is also contemplated within the invention to provide a relatively thick cylindrical wall for the saw-tipped distal extension for the sawing operation.

It is yet another object of the invention to provide a flange for the proximal end of the insert which provides anti-rotational lock elements comprising tabs which are integral with the flange and which are axially bendable from a position away from the front surface of the wall in which the insert has been screwed to a position within the wall material where the tabs act as locking elements against rotation which may be caused by the turning of a screw fastener within the insert in either direction.

In one modification of the invention, the saw-toothed end is provided with forwardly extending teeth for sawing through the wall board and with secondary teeth disposed rearwardly and radially inwardly of the forward teeth for mashing the wall board material to assure that the material will not create a blockage of the axial bore. In the embodiment disclosed, the cross-section of the saw-toothed end is octagonal and provides the sawing teeth on a circumference of rotation with a larger diameter than the circumference of rotation of the mashing teeth.

The preferred embodiment of the invention results from the discovery that the provision of but two saw teeth disposed 180° to one another about the circumference of the saw-toothed end facilitates the cutting operation at the surface of the wall board and makes a cleaner cut through the wall board than the provision of three, four or more cutting teeth. Testing with an insert having two teeth so disposed, surprisingly resulted in the sawed material entering the axial through bore at the saw-toothed end more readily so that there was less material being pushed to the rear surface of the wall. Resultingly, there is less or no tear at the rear surface of the hole. While three or four teeth at the saw-tooth end works very well, it is theorized that a greater number of rotating teeth presents a circular knife to the wall board material being sawed and that fewer teeth present interrupted cutting or slicing edges which more readily permit the disposition of the sawed material into the bore at the saw-toothed end thus presenting less resistance to the rotating teeth.

It has also been found that the disposition of the thread around the body of the insert close to the saw-toothed end provides a pulling action on the insert just as the saw teeth enter the wall and thus a quicker insertion.

The inventive inserts as disclosed are designed for being molded of strong plastic materials such as nylon or a mixture of nylon and "Kalvar" (a trademark of DuPont) combined but which may also be made of less strong plastics inasmuch as the friction normally arising because of drilling operations of prior art inserts, is diminished because of the saw-tipped end of the insert of the invention. These inserts may also be cast in zinc.

BRIEF DESCRIPTION OF THE DRAWINGS

FIG. 1 is a side elevational view of a saw-tipped insert embodying the invention;

FIG. 2 is a sectional view taken along the lines 2—2 of FIG. 1;

FIG. 3 is an elevational view of the flanged end insert of FIGS. 1 and 2 taken along the line 3—3 of FIG. 1;

FIG. 4 is a broken away side elevational view of the flanged end of the insert taken along the line 4—4 of FIG. 3;

FIG. 5 is a plan view of the saw-tipped end of the insert of FIGS. 1-4 taken along the line 5—5 of FIG. 1;

FIG. 6 is a sectional view taken along the line 6—6 of FIG. 1;

DETAILED DESCRIPTION OF THE INVENTION

Figure 7:
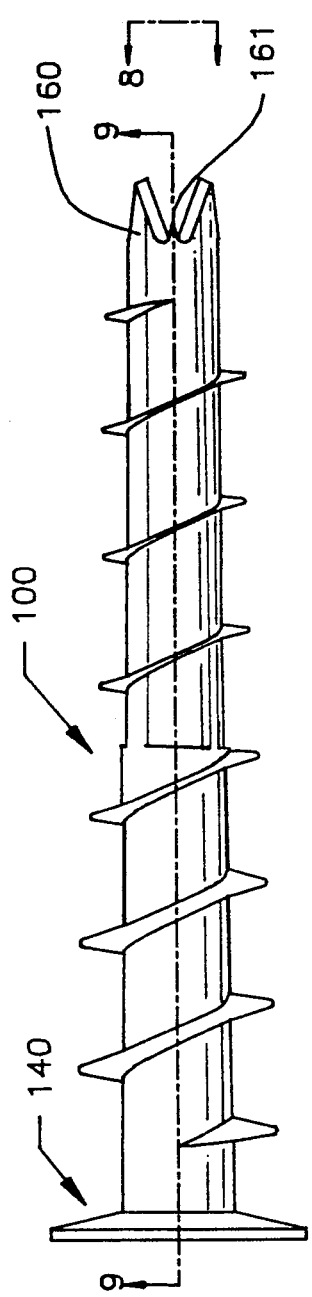
FIG. 7 is a side elevational view of a second embodiment of the saw-tipped insert of the invention.

Referring first to the embodiment of FIGS. 1-6, the insert 10 comprises a cylindrical body 11 having a proximal extension 12 with a flanged end and a distal extensions 13 with a saw-tipped end. The flanged end is tapered, in screw body fashion, from the flange 14 to just past mid-length of the insert where the saw-tipped section continues as a straight cylinder. The insert is outwardly threaded as at 15 substantially along its length from the flange 14 to the saw teeth 16 of the saw-tipped extension with the height of the thread diminishing from the flange to the saw teeth 16. Starting the thread close to the saw teeth in this and in the other embodiments shown has the effect when the insert is rotated of pulling the insert through the wall just as soon as the saw teeth have cut into the wall.

Internally, the insert is formed with an axial bore 17 splined as at 18 along the proximal section with a phillips screw head recess 19 extending inwardly from the proximal opening of the bore at the flanged end for rotationally driving the insert with a power driven screw driver.

The saw teeth 16 comprise a circular saw with four circumferentially spaced saw teeth at the distal opening of the bore at the saw-tipped end.

Figure 10:
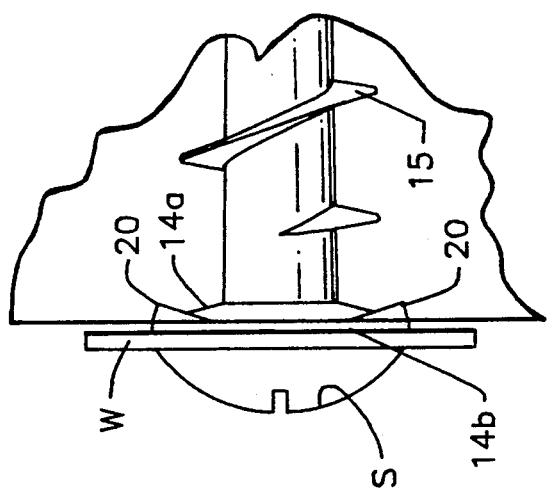
FIG. 10 is a diagrammatic elevational view of an insert of the invention inserted in a dry wall.

The flange extends annularly from the proximal end of the cylindrical insert and has a rearwardly sloped distal side 14a, a circular edge 14b and a flat proximal side 14c. Tabs 20, extending radially from the end of the flanged end of the cylindrical body, interrupt the annular extension of the flange. They are triangular in cross section, their outer surfaces shaped in the form of right triangles, with the apices forming the connections to the cylindrical insert and with the base and hypotenuse surfaces extending away from the flange. These tabs may be pressed into the wall material by work piece W which is secured by the screw fasteners against the wall when the insert is in place as shown in FIG. 10. They may be otherwise pressed into the wall manually or otherwise prior to screw fastener insertion or may be pressed into the wall by the undersurface of a screw head. In all events, when bent into the wall, they act as locking elements against rotation of the insert when the screw is either being screwed in or screwed out of the insert.

Note that the high thread 15 at the proximal end of the insert, together with the shaped distal side of the flange when embedded in the wall will act to compress the wall material in that area and thus resist further forward movement of the insert when the screw is tapping the splines.

Figure 8:
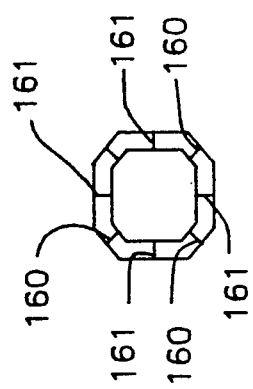
FIG. 8 is a cross-section taken along the line 8—8 of FIG. 7.
Figure 9:
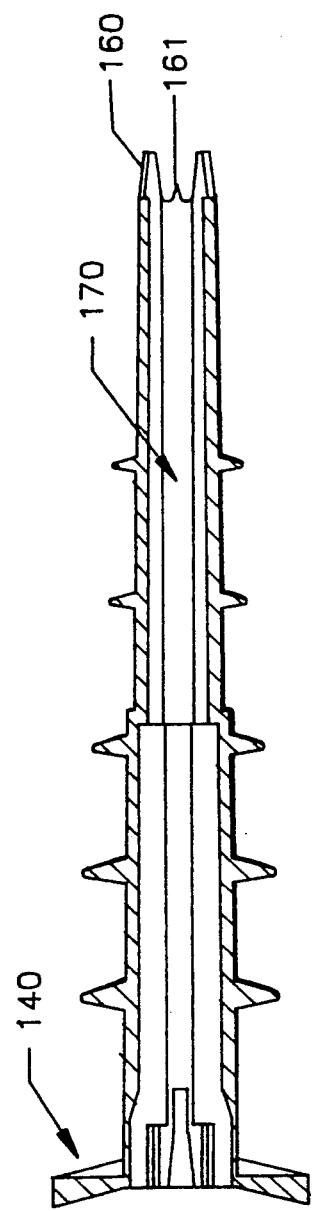
FIG. 9 is a plan view of the saw-tipped end of the insert of FIG. 7 taken along the line 9—9 of FIG. 7.

The embodiment of the invention shown in FIGS. 7-9 comprises an insert 100 having a flange 140 at the end of the proximal extension and primary saw-teeth 160 and secondary teeth 161 at the saw-tipped end of the distal extension.

The cross section of the distal extension is an irregular octagonal with long sides and short corners, otherwise the insert of FIGS. 7-9 is substantially the same as the insert disclosed in FIGS. 1-6. It is noted, however, that the tabs 20 are not shown at the flanged end in this embodiment which, as just noted, together with the high thread at the flanged end will provide anti rotation and forward movement resistance when the screw fastener is tapping the splines.

As seen in the plan view of the tip in FIG. 8, the primary or saw-teeth 160 are disposed along the four short sides of the octagonal tip and the secondary teeth 161 are disposed along the four longer sides of the octagonal tip, thus placing the saw-teeth 160 on a larger circumference of rotation than the secondary teeth. As can be appreciated, the teeth 160, when rotated against the wall material, will cut a wider circle then the secondary teeth 161. The secondary teeth, in fact, mash rather than cut the wall material within the smaller circumference to powder the material so that there will be no clogging of the bore 170 with wall material at the distal extension of the insert.

FIG. 10 is provided to show the insert of FIGS. 1-6 is in place and in which a screw S has been driven to capture a work piece W between the screw head and flange 14 of the insert. In this instance, the workpiece when forced against the tabs 20 bend the tabs into the wall material and act as anti-rotational lock elements so that the worker can complete fastening the workpiece to the wall without incurring screw thread-spline resistance sufficient to turn the insert. Similarly, when the workpiece is removed by unthreading the screw from the insert, the tabs remain in place and resist rotation of the insert so that the insert, in place, may be used once again. Note that the screw head is wide enough to bend the tabs absent a work piece and that the tabs may be bent manually or with the head of a screw driver or other punch tool.

Figure 11:
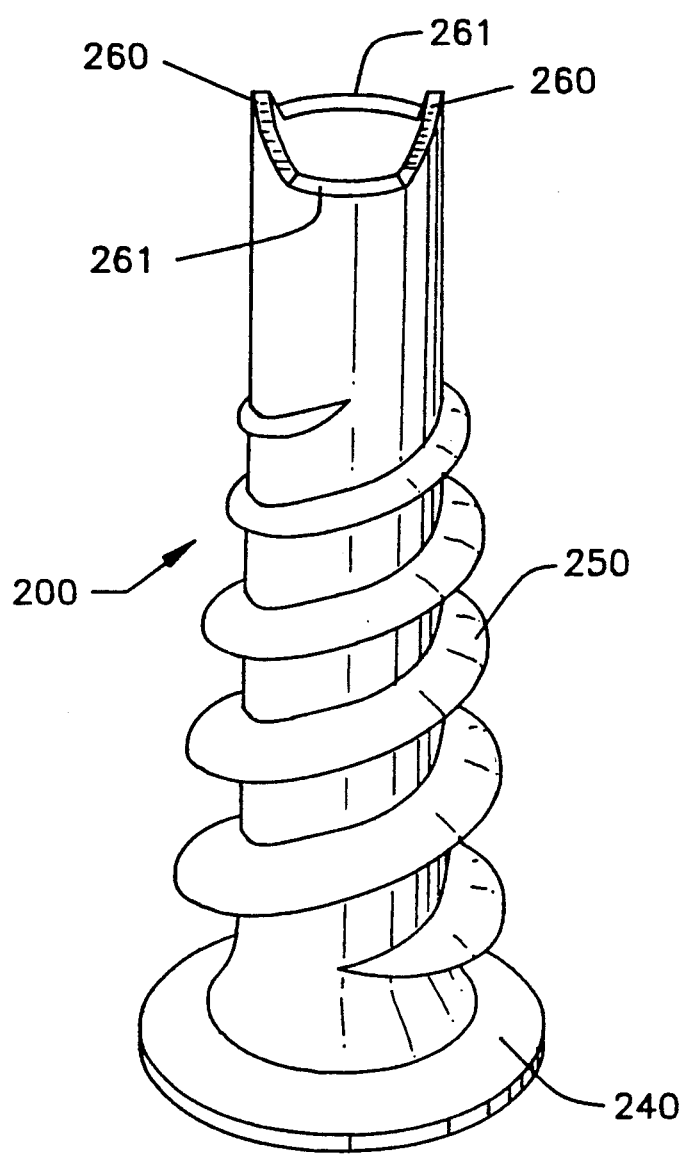
FIG. 11 is a perspective view of a preferred embodiment of the invention in a saw-tipped insert in which only two saw teeth are provided at the saw-toothed end of the insert.

In FIG. 11, the distal edge of the end of a saw tooth insert 200 is provided with but a single pair of teeth 260 disposed 180° from one another in the configuration of peaks separated by flat valleys 261 around the circumference of the tip of the saw-toothed end. The object of providing only two teeth is to quicken the sawing action, as it was discovered in testing of various insert tips that the efficiency of the sawing action of the insert was increased with the disposition of two teeth at the saw-toothed end and that the sawed material entered the axial bore more completely than with more than two teeth. In this embodiment of the invention, as in the others, the thread 250 extends from and diminishes in height from adjacent the flange 240 at the proximal end to the saw-tipped end adjacent the saw teeth 260.

Having described the invention with reference to particular embodiments, the claims which determine the metes and bounds of the invention are now set forth.

We claim:

1. A wall anchor for insertion in a wall, said wall anchor comprising a cylindrical body having an outer thread and an axial through passage extending from a flanged proximal end of said body to a saw-tipped distal end of said body, saw teeth extending distally from said distal end in the configuration of peaks separated by flat valleys circumferentially spaced about said distal end surrounding said through passage, said flat valleys comprising the distal edge of said distal end, means extending axially along said through passage from said proximal end for receiving the threads of a screw fastener and recess means at said flanged proximal end for receiving a drive tool for rotating said anchor for sawing through the wall with said saw-tipped distal end.

2. The wall anchor of claim 1 wherein said distal end comprises a straight cylinder.

3. The wall anchor of claim 2 wherein said thread extends and diminishes in height from said flanged proximal end to said saw-tipped end.

4. The wall anchor of claim 1 wherein said thread extends and diminishes in height from said flanged proximal end to said saw-tipped end adjacent said saw teeth.

5. The wall anchor of claim 1 wherein there are two saw teeth extending distally from said distal end and are radially spaced 180° from one another about said distal end surrounding said through passage.

6. The wall anchor of claim 5 wherein said thread extends and diminishes in height from said flanged proximal end to said saw-tipped end adjacent said saw teeth.

7. A wall anchor for insertion in a wall, said anchor having a distal extension octagonal in cross-section with short sides and long sides, the distal ends of said extension comprising an octagonal edge having short sides and long sides with saw teeth extending distally from said short sides of said octagonal edge for sawing through the wall and teeth means positioned rearwardly of said saw teeth and extending distally from said long sides of said octagonal edge for mashing wall material sawed loose by said saw teeth, said teeth being in the configuration of peaks separated by curved valleys circumferentially spaced about said octagonal edge.

8. The wall anchor of claim 7 wherein said saw teeth extending from said short sides comprise primary teeth for sawing through the wall and said teeth means extending from said long sides comprise secondary teeth for mashing wall material sawed loose by said primary teeth, said secondary teeth being disposed about a circumference of revolution smaller than the circumference of revolution about which said primary teeth are disposed.

* * * * *